Aug. 8, 1967  R. W. DAVIDSON  3,334,718
CARGO HANDLING APPARATUS
Original Filed July 19, 1963  3 Sheets-Sheet 1
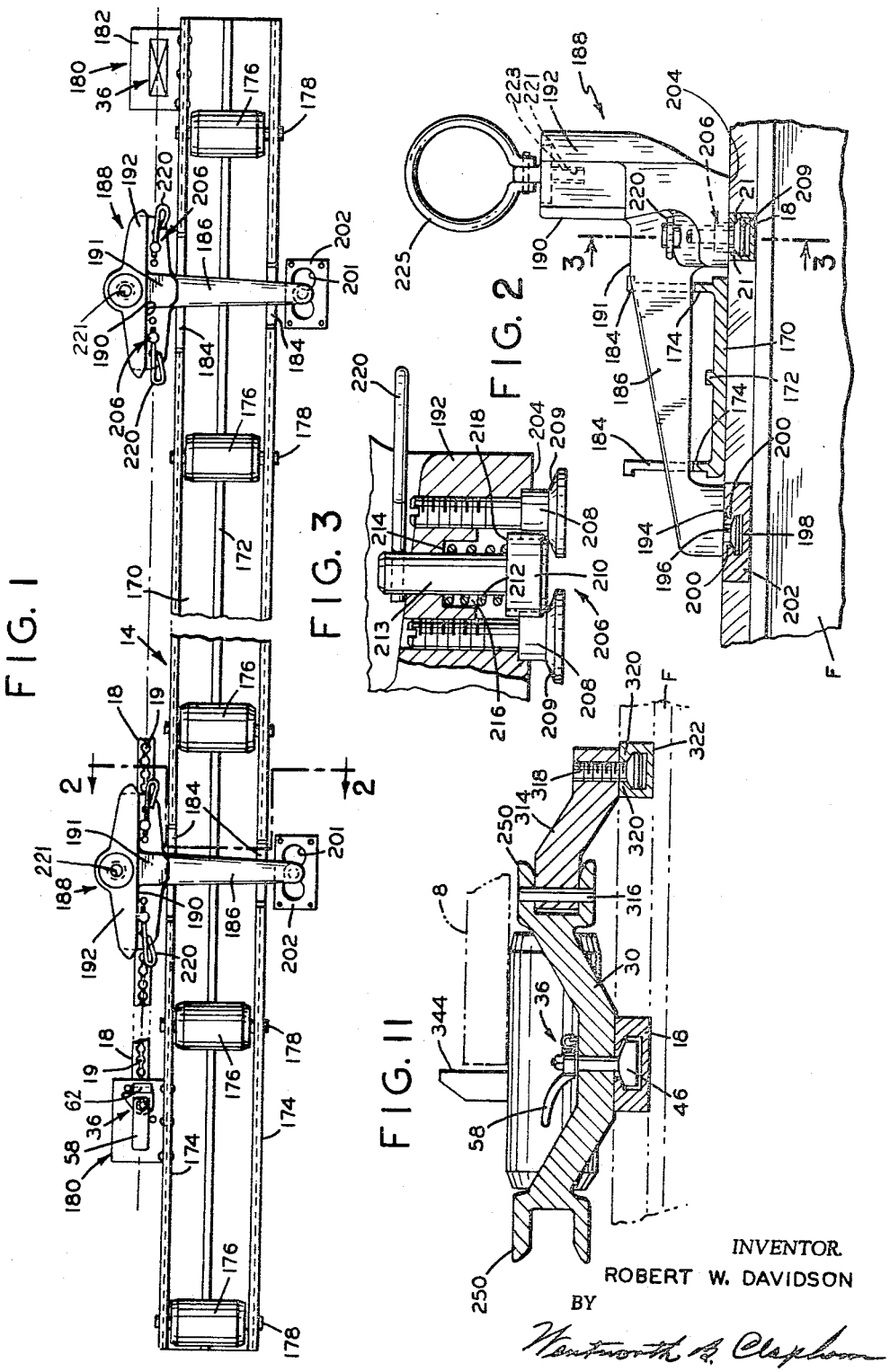
INVENTOR.
ROBERT W. DAVIDSON
BY
Wentworth B. Clapham
ATTORNEY.

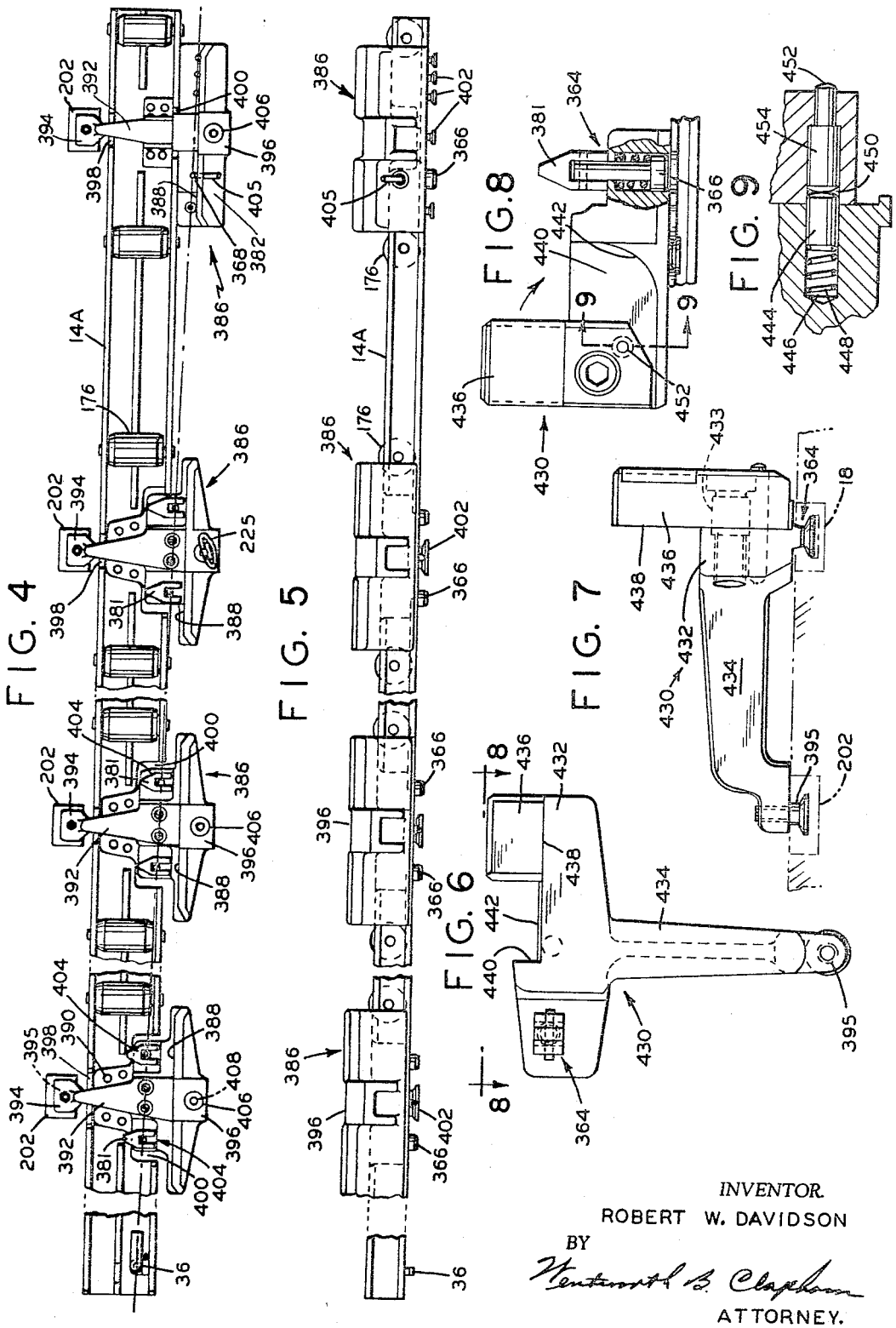

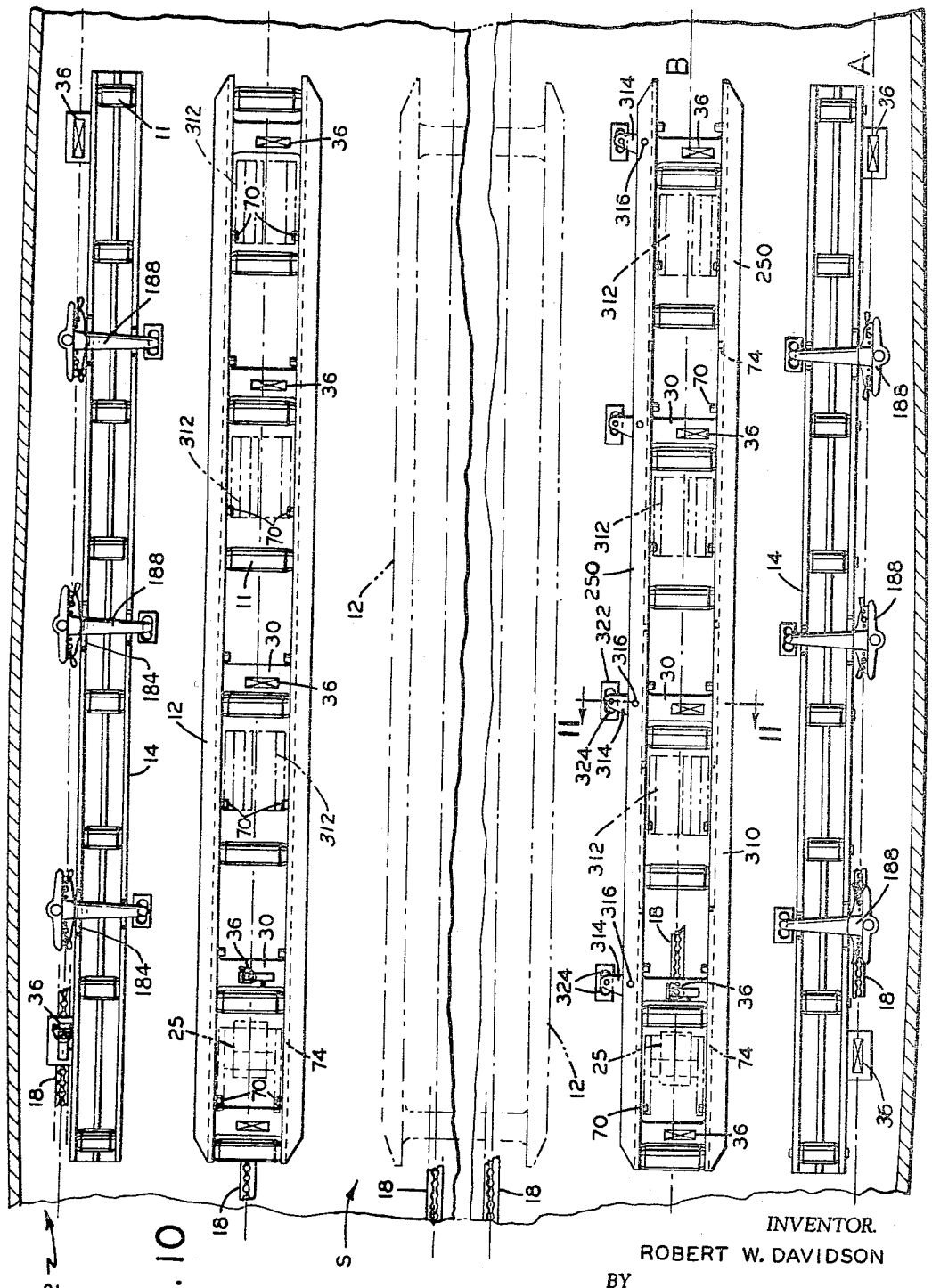

United States Patent Office 3,334,718
Patented Aug. 8, 1967

3,334,718
CARGO HANDLING APPARATUS
Robert W. Davidson, York, Pa., assignor to American Machine & Foundry Company, a corporation of New Jersey
Original application July 19, 1963, Ser. No. 296,177, now Patent No. 3,262,588, dated July 26, 1966. Divided and this application Mar. 29, 1966, Ser. No. 538,257
6 Claims. (Cl. 193—38)

ABSTRACT OF THE DISCLOSURE

A guiding and stop member for use in guiding cargo units; e.g., palletized loads, being loaded and unloaded in a carrier on a conveyor system and preventing substantial lateral movement thereof during transportation, which member is provided with a head and a shank extending substantially at right angles thereto and wherein the head has a vertical planar face against which the side of a cargo unit or pallet can bear and have its lateral movement restricted thereby, and wherein means are provided on the head and shank for attachment of the member to the floor of a carrier for coaction with the conveyor system.

---

The present invention is a division of my copending application, Ser. No. 296,177, now Patent No. 3,262,588, filed July 19, 1963 for Cargo Handling Apparatus.

This invention relates to cargo handling apparatus and more particularly to mechanism useful in preventing movement of cargo in a carrier while it is being transported.

Mechanism embodying the invention is well adapted for use with cargo handling apparatus such as disclosed in my copending application, Ser. No. 296,177, now Patent No. 3,262,588, to which reference is made for full description and disclosure of the apparatus with which the guide mechanism disclosed in this application forms a part. It is to be understood, however, that the novel guide mechanism disclosed herein can find other uses with other suitable types of cargo handling apparatus.

It is an object of the invention to provide novel guide mechanism for preventing unwanted sidewise displacement of cargo in a carrier while being transported.

The invention further consists in the provision of novel guide means which cooperates with load support mechanism in such manner that loaded pallets or the like supported on such mechanism is substantially completely restrained against unwanted sidewise displacement while being transported in a carrier equipped with such supporting mechanism.

The invention further comprises novel guide and lateral restraint mechanism having means which enable it to be detachably secured to a carrier in such manner that it cooperates with roller trays forming a part of a cargo handling system and wherein the guide mechanism prevents unwanted sidewise or lateral displacements of cargo supported on such trays.

The invention further consists in the provision of novel mechanism including selectively operated, detachably mounted side guide mechanism and coacting stationary side guide units which make it possible for all or selected portions of the cargo spaced in a carrier such as an airplane, to handle pallets of lesser width than that for which the system normally is designed to handle. The novel guide mechanism embodying the invention coacts with cargo conveying and supporting devices, such as elongated roller trays.

With these and other objects not specifically mentioned in view, the invention consists in the novel features pointed out and described more in detail hereinafter, and set forth in the claims hereunto appended.

FIGURE 1 is a plan view of a preferred embodiment of the invention.
FIGURE 2 is a view taken on line 2—2 in FIGURE 1.
FIGURE 3 is a view taken on line 3—3 in FIGURE 2.
FIGURE 4 is a plan view of a modified form of side guide and roller conveyor assembly embodying the invention.
FIGURE 5 is a side view of the assembly shown in FIGURE 4.
FIGURE 6 is a plan view of a modified side guide embodying the invention.
FIGURE 7 is a side view of the guide shown in FIGURE 6.
FIGURE 8 is a view taken on line 8—8 in FIGURE 6.
FIGURE 9 is a view taken on line 9—9 in FIGURE 8.
FIGURE 10 is a plan view showing the side guides and selectively operated side guides which cooperate therewith embodied in the invention as used in a cargo handling apparatus installed in a typical carrier; and
FIGURE 11 is a view taken on line 11—11 on FIGURE 10.

Referring to the drawings, loaded pallets or containerized cargo units are delivered into a carrier, such as an airplane, or other carrier as for example railroad cars, trucks and ships. As shown herein, and especially in FIGURE 10, the carrier is an aircraft designated generally 2. The aircraft is provided with a plurality of suitably laterally spaced inner conveyor trays 12 and outer trays 14, secured to seat rails or other suitable attachments mounted to or forming a part of the floor structure, and extending longitudinally along the aircraft floor above the floor structure.

Outer or guide trays 14 extend along the floor of airplane 2 or other carrier in which they are installed in substantially parallel relationship with inner trays 12. Preferably they are the same in length as trays 12, as shown in FIGURE 1. In the illustrated embodiment, each tray 14 comprises an elongated channel member having a base 170 with an integral central reinforcing rib 172 and two upstanding spaced walls 174. Preferably tray 14 is an extrusion formed from a light weight metal such as aluminum or an aluminum alloy, which provides great strength with a minimum of weight. Each tray is provided with one or more low friction or ball bearing rollers 176 which are supported in longitudinally spaced relation on shafts 178 mounted in spaced walls 174.

Longitudinally spaced brackets 180 attached to the exterior of one wall 174, see FIGURE 1, provide means for detachably securing trays 14 to the floor of airplane 2, as in the case of trays 12. Brackets 180 have angularly extending portions 182 in which are operatively mounted locking fittings 36. Handle 58 when positioned as shown in FIGURE 1, in engagement with spring part 62, maintain tray 14 in detachably secured coaction with seat rail 18.

The walls 174 of trays 14 are provided with transversely aligned, preferably equidistantly spaced, sets of recesses 184 through which extend shanks 186 of T-shaped guide members 188, see FIGURES 1 and 2. The number of sets of recesses 184 will depend upon the length of a tray 14 and the number of side guide members 188 which are required to contain the side loads to which they will be subjected. The inner or guide face 190 of each head 192 of members 188 is flat and lies in a plane at right angles to an adjacent flat face 191 on shank 186 and the longitudinal axis of shanks 186. Thus, when members 188 are installed as shown in FIGURES 1 and 2, guide faces 190 lie in the same vertical plane in order to provide a satisfactory abutment and serve as guides for pallets 8 resting upon the roller conveyer trays 12 and 14 of system S, as they are loaded and unloaded in aircraft 2.

T-shaped guide members 188 are the same in construction and hence only one need be described in detail. Referring to FIGURES 1 and 2, it will be seen that the base of head 192 and the free end of shank 186 are flat and coplanar. Hence when each member 188 is installed, its guide face 190 lies in a plane substantially normal to the floor of the carrier; i.e., airplane 2. Base 194 of the free end of shank 186 mounts a tension fitting 196 secured therein in any suitable manner, as by screws (not shown). When installed in airplane 2, the head 198 of fitting 196 is located beneath opposed abutments 200 of plate 202 suitably attached to the aircraft. As shown in FIGURE 1, each seat plate 202 is provided with a circular opening 201 connecting with abutments 200, the arrangement corresponding to a short section of seat rail 18.

Base 204 of head 192 carries two sets of locking fittings 206 projecting downwardly therefrom for coaction with seat rails 18. Each set of locking fittings comprises two spaced tension members 208 with a vertically movable cylindrical shear head 210 located therebetween. Tension fitting members 208 have heads 209 adapted to be seated in locking engagement beneath opposed abutments 21 in seat rail 18. Shear head 210 normally is maintained in outwardly projecting arrangement with the bottom face of head 192 of a T-shaped guide member against the action of a spring 212 which encircles a pin 213 attached to head 210 and extends upwardly through head 192. Spring 212 bears against the upper end 214 of bore 216 in head 192 and against the upper surface 218 of head 210. A handle 220 carried by pin 213 provides means for moving shear head 210 upwardly in head 192 such that members 208 can be inserted in openings 19 in a seat rail 18 at which time the T-shaped guide member can be shifted so as to dispose heads 209 of tension members 208 beneath abutments 21, whereupon when handle 220 is released, shear head 210 is seated in an opening 19 and T-shaped member 188 now is locked in seat rail 18 in its desired installed position, with the head 198 of a tension fitting 196 also engaged beneath abutments 200. It will be appreciated that when a T-shaped guide member 188 is being installed both handles 220 are operated so that tension members 208 can be inserted freely into the openings in a seat rail 18. Arcuate cut-out sections on opposite sides of shear heads 210 allow these heads to partially encircle reduced shank portions of members 208 in known manner, thereby preventing rotation of handles 220.

In some cases it may be desirable to tie cargo securing belts, ropes, and the like to securing members. For this reason, each T-shaped member 188 is provided with a threaded bore 221 in which the threaded shank 223 of a tie ring 225 can be screwed to mount ring 225 thereon. See FIGURE 2.

FIGURES 4 and 5 disclose a modified form of side guide, designated generally 386 which, in accordance with the invention, makes it possible to insure proper guiding and securing of cargo in cases where a seat rail is mounted in a skewed or diagonal manner in the aircraft. In a situation such as this, one or both outer guide tracks comprising at least one guide tray 14A in a skewed zone is so constructed that the several guide members 386 of a modified form corresponding to T-shaped guide members 188 are mounted thereon such that their vertical guide faces or surfaces lie in the same vertical plane as all of the corresponding vertical faces or surfaces 190 of the several tandemly arranged trays 14 constituting an outer track.

Because of the fact that each T-shaped guide member 386 in a modified outer tray 14A may vary somewhat in order to insure the necessary planar arrangement of guide faces 388 thereof, they are attached to outer tray 14A, as by bolts or rivets 390. Each guide member 386 is generally the same as members 188. It is provided with a shank 392, a free end 394 with tension fitting head 395 seated in a plate 202 and a head portion 396 having shear fittings 366 and tension fittings 402 referred to hereinafter, all constructed and operating in the same general manner as T-shaped guides 188, except that the latter are not fastened to trays 14.

The modified trays 14A are of the same construction as trays 14 as to cross section, rollers 176 and mounts therefor. They are provided with larger recesses and cut-outs 398 and 400, than cut-outs 74, in order to accommodate modified T-shaped guide members 386. Appropriately spaced tension fittings 402 project outwardly from the bottom flat face of head portions of members 386. These fittings are in predetermined spaced relationship with shear fittings 366 mounted in head portions 396 which are similar in construction and operation as locking fittings 364 shown and described in my copending application Ser. No. 296,177, now Patent No. 3,262,588. Actuating arms 381 effect the desired retraction or entry of shear heads out of or into apertures 19 of a selected seat rail 18, when removing or installing a tray 14A. This type of locking fitting is of considerable assistance to a mechanic when installing or removing a tray. This is because all actuating arms 381 can be lifted up or moved down in order that the several tension fittings can be seated beneath or moved out of engagement with abutments 21 without concern as to positioning of shear heads 366.

In the case of the T-shaped guide shown at the extreme right in FIGURES 4 and 5, the main part of head portion 396 is disposed outside tray 14A because there is a minimum of space available at this position in the installation or removal of tray 14A, an operating pin 405 pivotally connected to pin 368 is substituted for lever 381. Pin 405 projects from its pivotal connection to pin 368 through a hole formed in wall 386 of head portion 396 of tray 14A. Thus merely by pressing downwardly on the free end of pin 405, the position of shear head 366 can be controlled as desired. In installing or removing a tray 14A provided with a special locking fitting using an actuating arm or pin 405, all actuating arms 381 are disposed as shown in FIGURE 4. Hence, the only locking element which must be operated manually at this time is locking pin 405. The need for providing this special locking pin 405 will depend upon the length of a tray 14A, and the amount of space available for its installation. As in the case of T-shaped guide members 188, members 386 are provided with cylindrical bases 406 having tapped extensions 408 in heads 396 in which tie-down fittings 225 can be mounted.

In order to provide against lateral movement of a loaded pallet (not shown) locked in a vehicle, e.g., an airplane, in flight position at the loading station, complementary guide units 430 are provided. See FIGURES 8-11. These units correspond generally with guide members 188 in their construction and method of mounting in the airplane. They are, however, so formed that when the carrier is being loaded or unloaded, their guiding and side movement preventing members are located in inoperative positions in order that cargo can be moved thereover into and out of the aircraft, as the case may be.

Units 430 preferably are aligned transversely with T-shaped guide members 188. Each unit 430 is the same in construction and function and, therefore, a description of one will suffice. It is formed in general T-shape with a head 432 and shank or leg 434. The head and shank are detachably secured to the floor of the aircraft by the same means as guide members 386; i.e., tension fittings 395 and plates 202 and locking fittings 364.

Head 432 pivotally supports on pin 433 a guide and locking block 436 provided with a flat guide and support face 438 for preventing lateral movement of a loaded pallet resting on ball mats, shown in FIGURES 1 and 18 in my copending application Ser. No. 296,177, between T-shaped guide members 188 and blocks 436 of guide units 430. Head 432 is formed with a cut-out portion 440 having an arcuate section 442 which allows block 436 to be moved from an inoperative position wherein its top edge lies flush with the top edge of head 430 to the full line operative position shown in FIGURES 8, 9 and 10. In this manner, loaded pallets can be moved into and out of an aircraft without obstructions by blocks 436. However, when blocks 436 occupy their operative positions they provide an effective support against lateral or sidewise movement of a pallet in the aircraft.

Block 436 is maintained in its operative position by means of a detent pin 144 slidably mounted in bore 446 in head 432. Pin 444 is urged by spring 448 into a complementary bore 450 in block 436. When it is desired to swing block 436 into its inoperative position in cut-out portion 440, the mechanic merely presses button 452 slidably mounted in block 436. Button 452 which forms a part of a pin 454 slidably mounted in bore 450 when so pressed carries pin 454 to move detent pin 444 out of bore 450 whereup block 438 is free to be turned to its inoperative position.

What is claimed is:

1. In a carrier having a cargo supporting floor and a conveyor system carried by said floor, a guiding and stop member coacting with said conveyor system and for preventing substantial lateral movement thereof during transportation, comprising a head and a shank extending substantially at right angles thereto, said head having a vertical planar face against which a side of a cargo unit can bear and have its lateral movement restricted thereby, and means on said shank and said head for securing said member to the floor of said carrier.

2. The invention defined in claim 1, wherein said shank is an elongated arm, extending outwardly from said vertical planar face of said head, and said means on said shank attaching said member to the floor of said carrier to prevent overturning of said member during application of pressure by a cargo unit against said face.

3. The invention defined in claim 2 wherein said arm is provided with an elongate cut-out under which cargo conveying roller trays may be positioned.

4. The invention defined in claim 1 wherein said head includes a cut-out section and an arm pivotally mounted in said cut-out section, said arm when in its inoperative position being disposed in said cut-out section, and when in its operative position said arm extends upwardly substantially at right angles to said head to provide said planar face against which a side of a cargo unit can bear.

5. The invention defined in claim 1 wherein said securing means on said head comprises spaced tension fittings projecting outwardly from the bottom flat face of said head portion and similarly extending retractable shear fittings, the combination being operative to secure said guide member to aircraft seat rails.

6. The invention defined in claim 1 wherein said head portion is provided with a threaded bore for receiving the threaded shank of a complementary securing ring.

References Cited

UNITED STATES PATENTS

| | | | |
|---|---|---|---|
| 3,091,317 | 5/1963 | Just | 193—38 |
| 3,093,092 | 6/1963 | Martin et al. | 244—118 X |
| 3,111,212 | 11/1963 | Garland et al. | 193—38 |
| 3,212,457 | 10/1965 | Looker | 105—369 |

EVON C. BLUNK, *Primary Examiner.*

M. L. AJEMAN, *Assistant Examiner.*